United States Patent [19]

Cucchi et al.

[11] Patent Number: 4,604,924
[45] Date of Patent: Aug. 12, 1986

[54] CONTROL DEVICE FOR THE OPENING AND CLOSING OF THE METAL BAR SLIDING GUIDES IN AN EQUIPMENT FOR THE FEEDING OF METAL BARS TO A MULTIPLE-SPINDLE LATHE

[75] Inventors: Giovanni Cucchi; Pietro Cucchi, both of Bussero, Italy

[73] Assignee: F. lli Cucchi S.r.l., Bussero, Italy

[21] Appl. No.: 624,859

[22] Filed: Jun. 26, 1984

[30] Foreign Application Priority Data

Jul. 8, 1983 [IT] Italy ............... 21988 A/83

[51] Int. Cl.⁴ ........................... B23B 13/04
[52] U.S. Cl. ........................... 82/27; 414/16; 82/38 A
[58] Field of Search ............ 82/2.5, 2.7, 38 A, 3; 414/14, 16

[56] References Cited

U.S. PATENT DOCUMENTS

| | | | |
|---|---|---|---|
| 3,447,694 | 6/1969 | Hartle | 82/2.7 |
| 3,874,519 | 4/1975 | Mikami | 82/2.7 |
| 4,292,864 | 10/1981 | Cucchi et al. | 82/2.7 |
| 4,295,396 | 10/1981 | Hasslauer | 82/2.5 |

FOREIGN PATENT DOCUMENTS

| | | | |
|---|---|---|---|
| 134104 | 10/1981 | Japan | 82/2.7 |
| 818009 | 8/1959 | United Kingdom | 82/2.7 |
| 1212152 | 11/1970 | United Kingdom | 82/38 A |
| 2102312 | 2/1983 | United Kingdom | 82/2.7 |

Primary Examiner—Francis S. Husar
Assistant Examiner—Jerry Kearns
Attorney, Agent, or Firm—Seidel, Gonda, Goldhammer & Abbott

[57] ABSTRACT

A device is described which is meant to control the opening and closing of the metal bar sliding guides in a multiple-spindle lathe feeding equipment.

Each sliding guide consists of two parts, a fixed one and a mobile one, and the device to open and close them is mainly made up of a locking pin integral with the fixed guide part, the releasing of which allows a mobile element to control the turning of a shaft with which the mobile guide part is integral.

11 Claims, 14 Drawing Figures

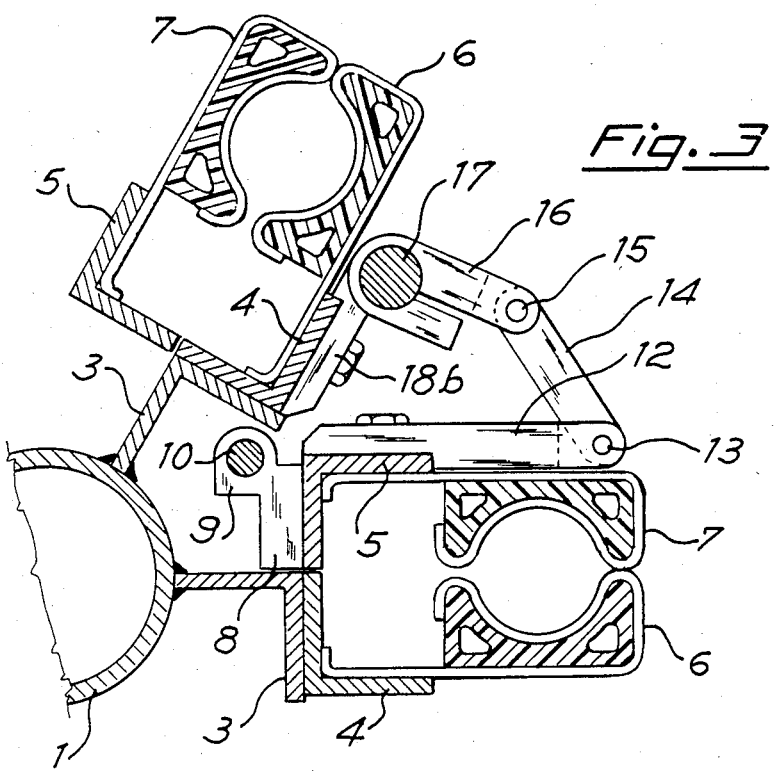

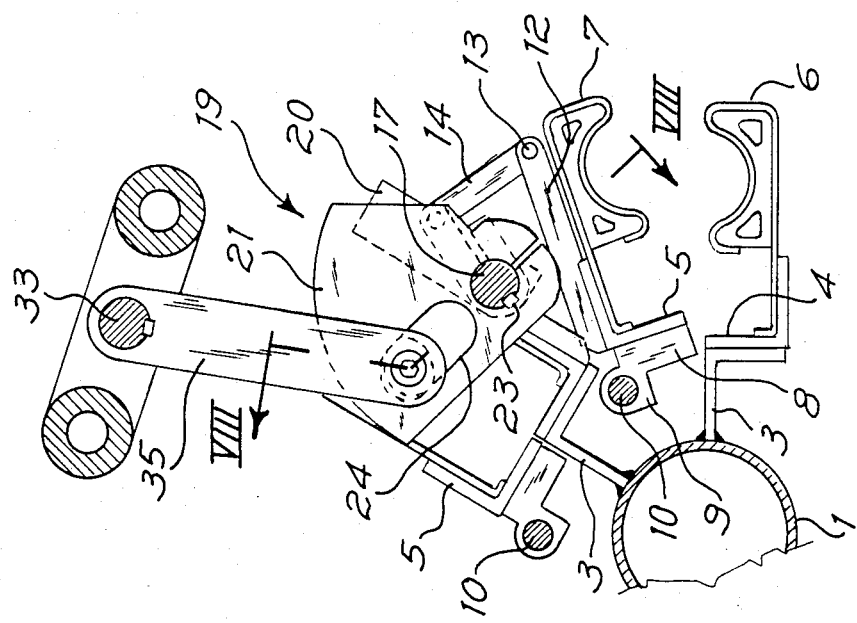
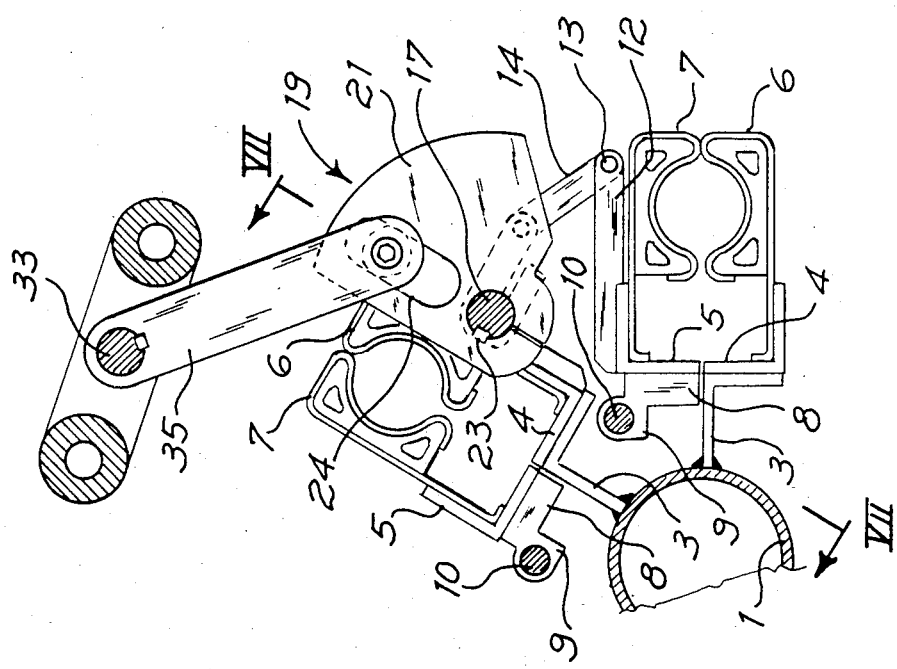

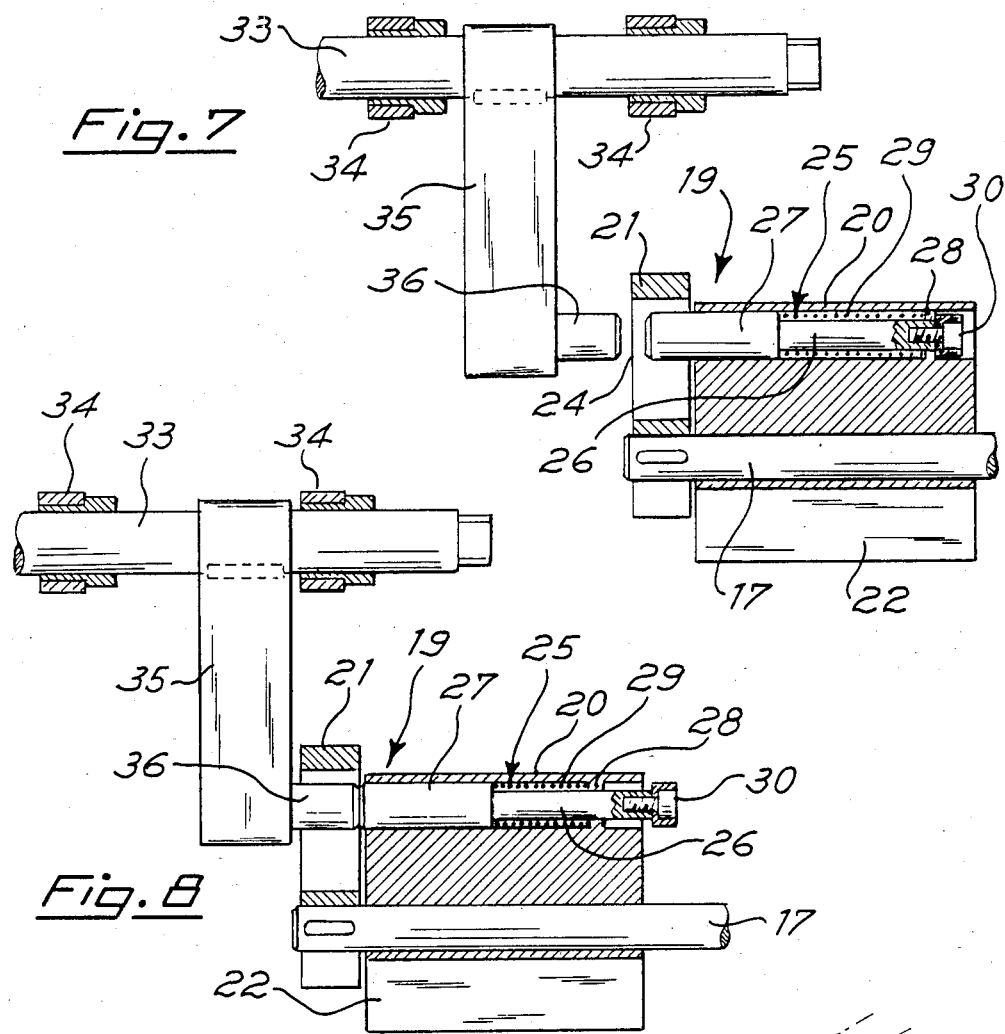
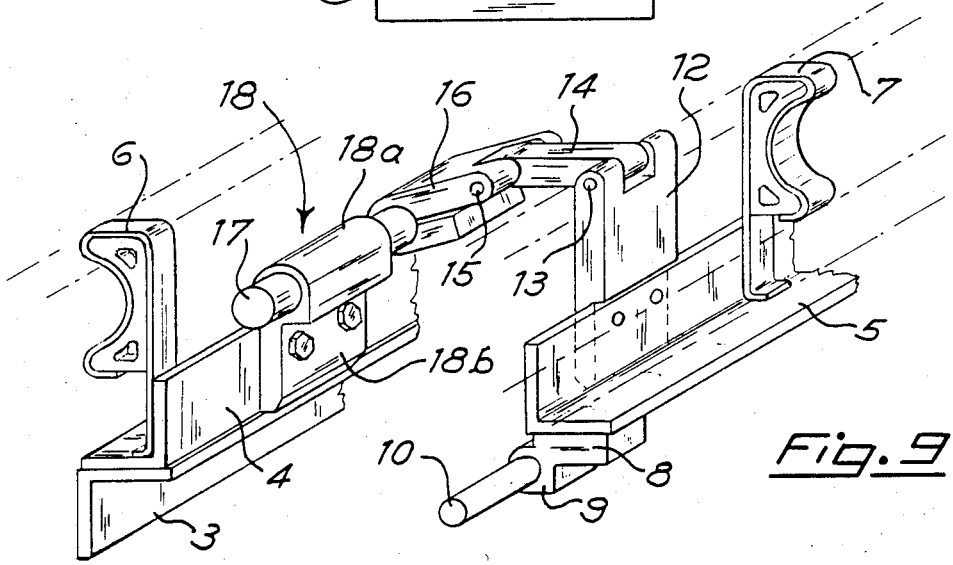

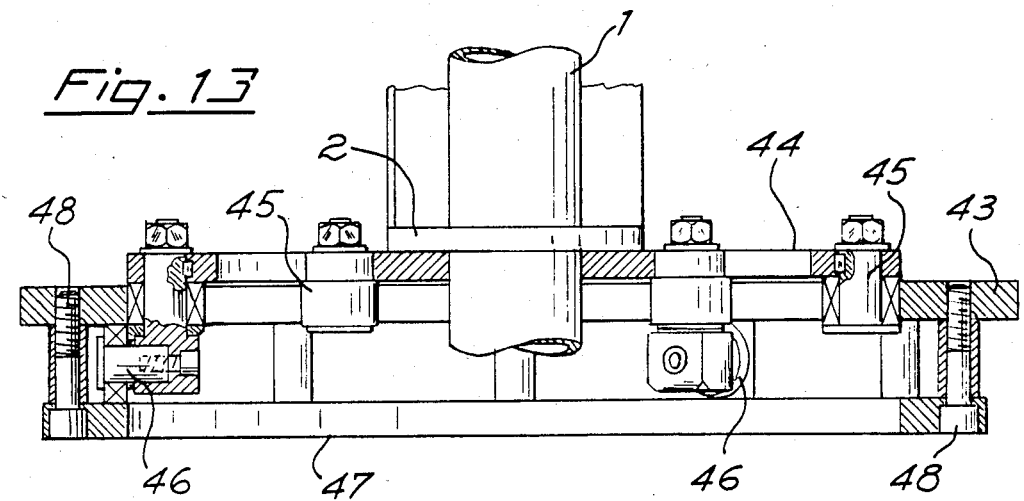
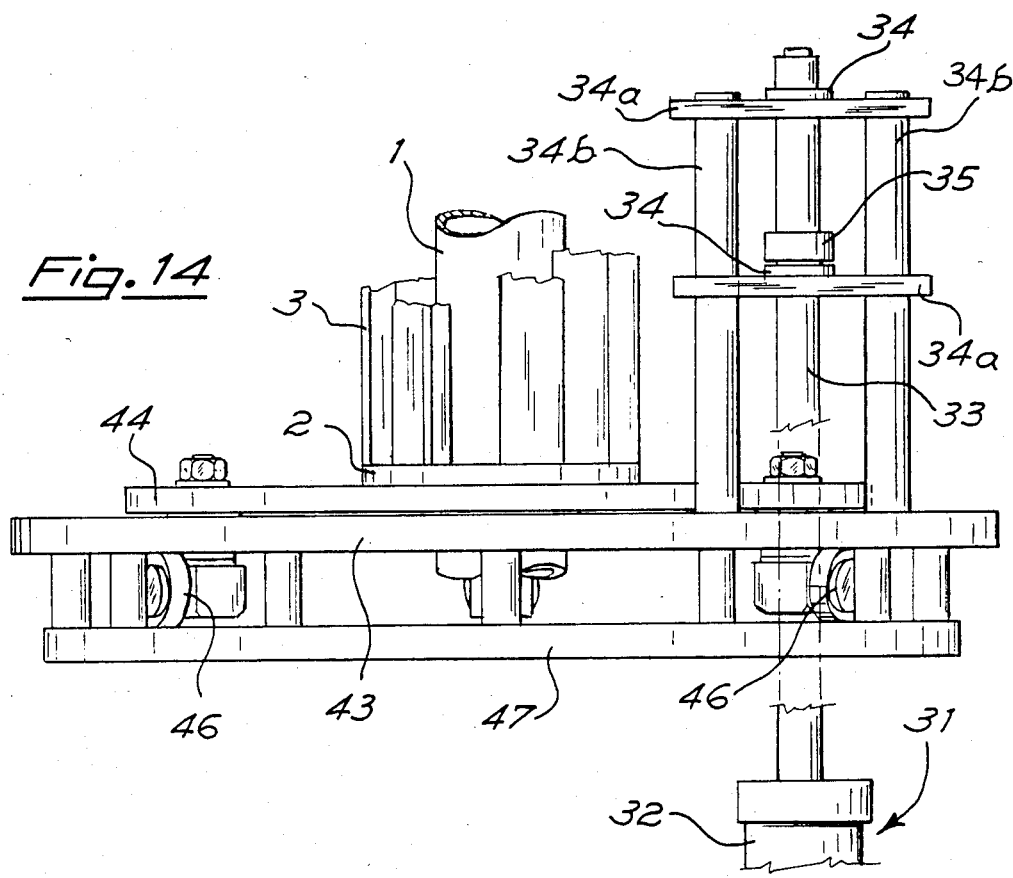

CONTROL DEVICE FOR THE OPENING AND CLOSING OF THE METAL BAR SLIDING GUIDES IN AN EQUIPMENT FOR THE FEEDING OF METAL BARS TO A MULTIPLE-SPINDLE LATHE

BACKGROUND OF THE INVENTION

This invention regards a control device for the opening and closing of the metal bar sliding guides in a multiple-spindle lathe feeding equipment.

It is known that metal bars are fed to a multiple-spindle lathe through an appropriate equipment basically consisting of a turning drum, on which sliding guides, are angularly placed at the same distance, inside which the bars are fed through appropriate bar-pushers to the different spindles of the lathe in order to allow the accomplishment of the various machining operations required.

The aforesaid sliding guides can be opened so as to permit the insertion of a metal bar into each of them at the beginning of each working cycle. The bars are inserted transversally as against the sliding guide, which has therefore to be completely opened longitudinally in order to allow the bar to be inserted.

To solve the question concerning the opening and the following closing of the sliding guides in an equipment like that, a lot of technical solutions have been worked out that permit to reach the aim on one side, but on the other side turn out to be extremely complicated as for their construction and maintenance. Furthermore they are very expensive and shall be operated by particularly skilled personnel, owing to their complicated construction.

Moreover metal bar feeding devices imply that the longitudinal axes of the sliding guides are kept perfectly parallel to one another during operation to prevent any seizure particularly while the bars are being inserted into the guides.

In traditional machines the supports of the sliding guides do not permit to assure the aforesaid parallelism and it often leads to a non-precise introduction of the bars into the guides.

SUMMARY OF THE INVENTION

A device has been created and is the object of this invention that can control the opening and closing of the sliding guides in an equipment for the feeding of metal bars to a multiple-spindle lathe, this device allowing to overcome all the disadvantages of traditional equipment, since this device is characterized by a very simple construction and a high operation reliability degree. The opening and closing of the sliding guides take place completely automatically, and the seizure possibilities are substantially eliminated thanks to its extremely simple construction.

It is known also that the loading of metal bars in a multiple-spindle lathe feeding equipment shall very often be carried out in more than one station, "station" meaning here one of the position the guide may find itself in during the drum turning. Thanks to the very simple construction of the device that is the object of this invention the loading of the bars, that is to saiy the opening of the sliding guides concerned, can be accomplished in as many stations as it is desired, the opening of the guides in one station being independent of that in the others.

According to another aspect of the device that is the object of this invention, it allows to get and to assure a perfect, permanent parallelism condition for the longitudinal axes of the sliding guides thanks to the particular supports the turning drum is equipped with, on which they are placed.

BRIEF DESCRIPTION OF THE DRAWINGS

The features and the advantages of the device object of this invention can be found in the following detailed description of a not limiting embodiment of the device itself, with reference to the attached figures of which:

FIG. 3 is a view as per section III—III of FIG. 1 and shows two adjacent guides in the close condition;

FIG. 4 is a view as per section IV—IV of FIG. 2 and shows one of the two guides in FIG. 3 in the open condition;

FIG. 5 is a view as per the direction of arrow V—V of FIG. 2 And shows the control contrivances for the opening of the guides, two adjacent guides being in the close condition;

FIG. 6 is a view similar to that in FIG. 5, one of the two adjacent guides being open;

FIG. 7 is a view of the device as per section VII—VII of FIG. 5;

FIG. 8 is a view of the device as per section VIII—VIII of FIG. 6;

FIG. 9 is a perspective view in enlarged scale that is meant only to show one of the hinge joints between two adjacent guides;

FIG. 13 is a view as per section XIII—XIII of FIG. 12;

FIG. 14 is a plan view of the supports in FIG. 12.

DESCRIPTION OF THE PREFERRED EMBODIMENT

Figure 1:
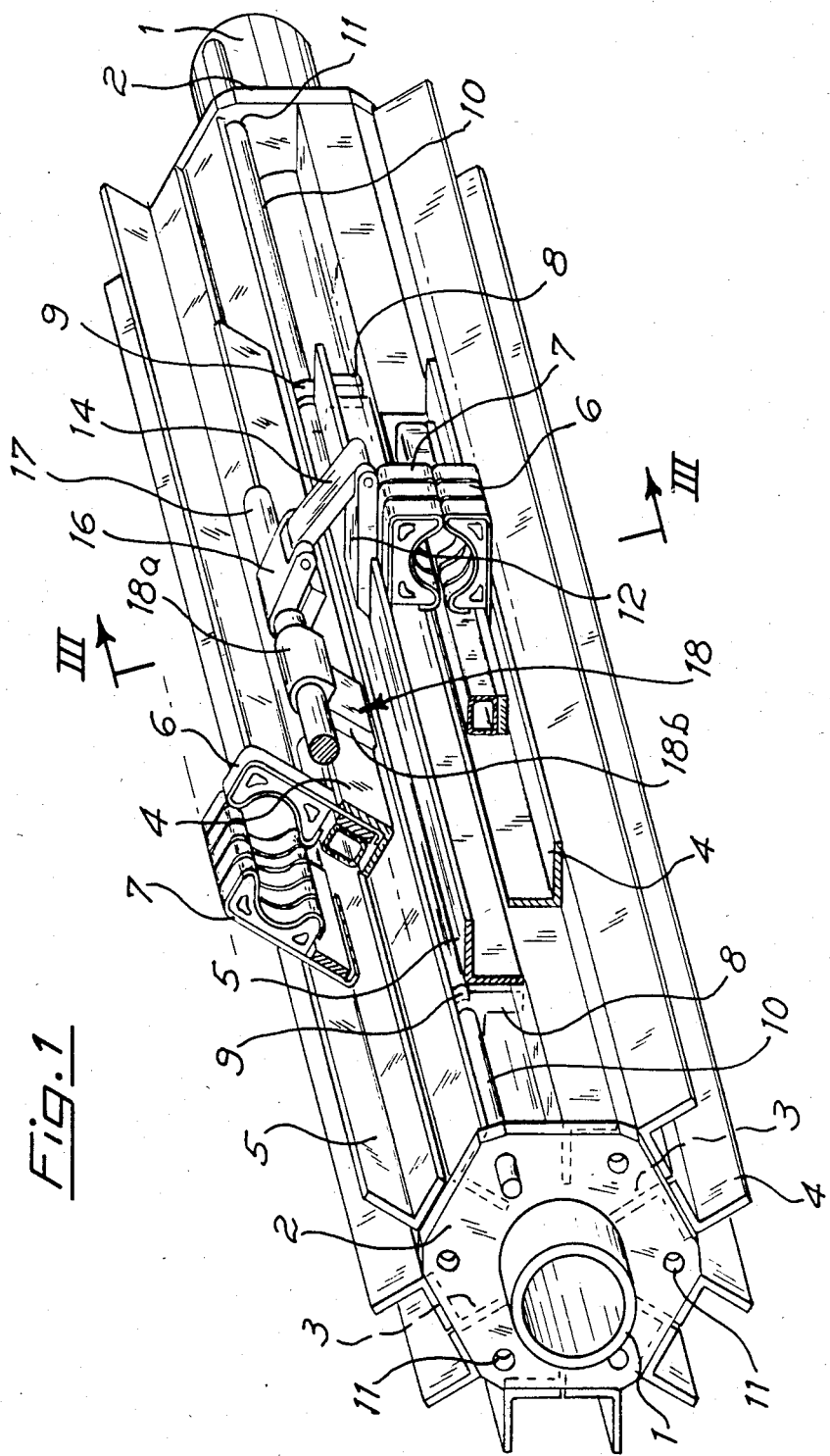
FIG. 1 is a perspective view and shows the supporting drum and part of two sliding guides, besides the corresponding contrivances to open and close them.
Figure 2:
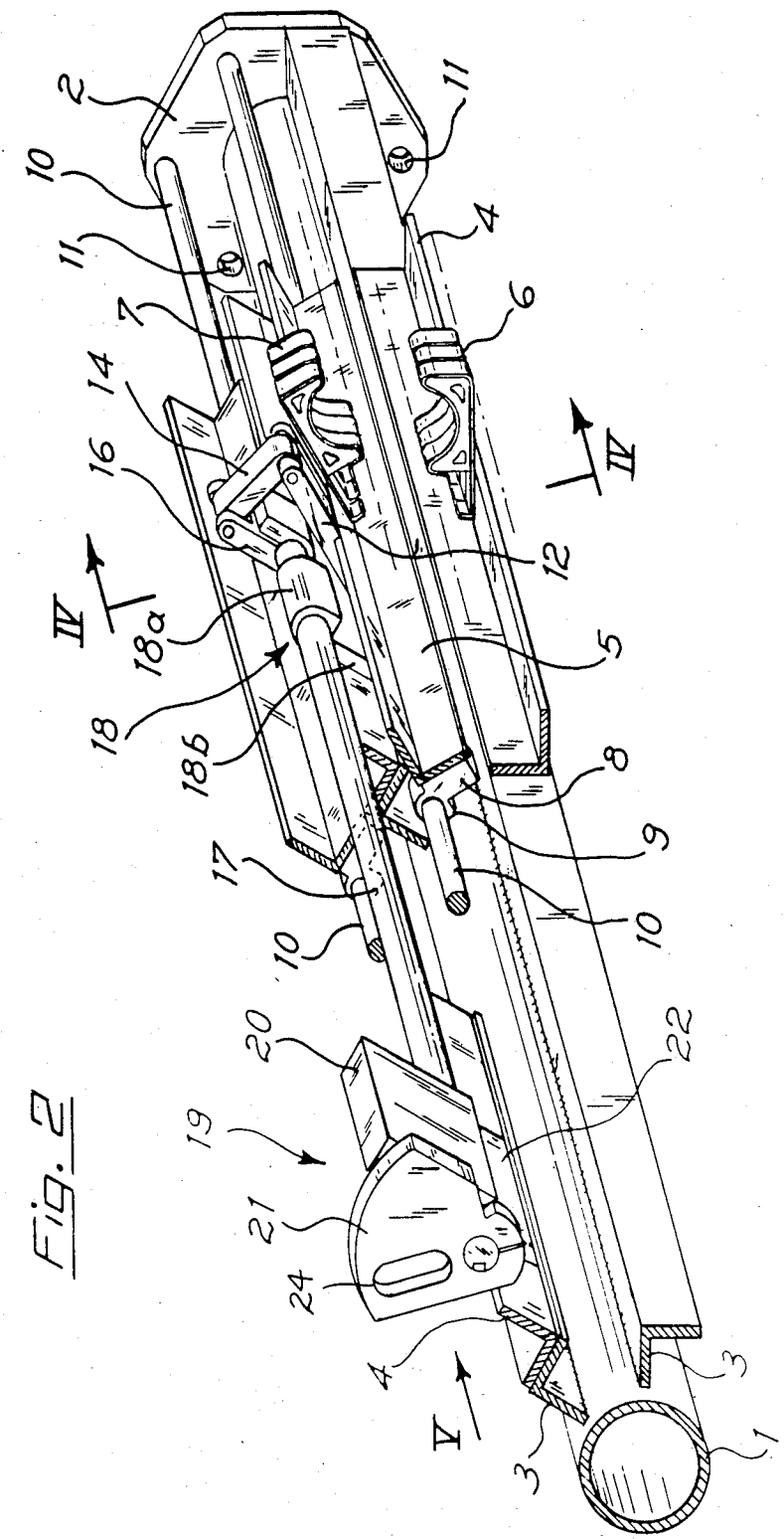
FIG. 2 Is a view similar to that in FIG. 1 and shows specifically the control contrivances for the opening and closing of the guide.
Figure 10:
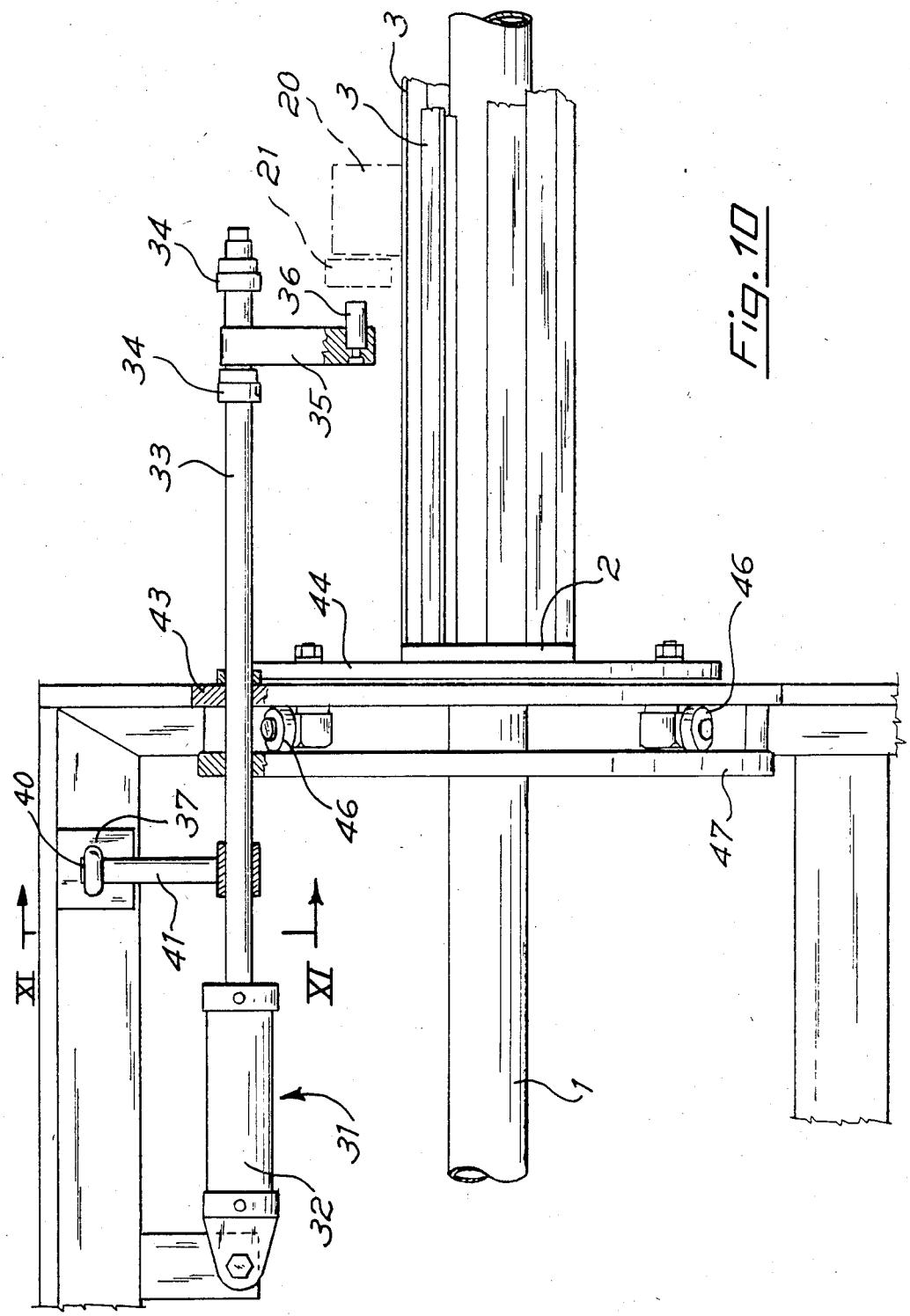
FIG. 10 shows a detail of the driving gadgets of the control contrivances of the device that is the object of this invention.

With particular reference to FIGS. 1 and 2, the device as per this invention includes a turning drum on which there are mounted the metal bar sliding guides and the corresponding connection devices that account for the opening and closing of the guides, when the former are operated by the control contrivances.

Only a section of the drum as per FIGS. 1 and 2 is shown and it can be considered as a modular section, since it is possible to get a drum of any length consisting of various sections like the shown one. In the following, only for clearness reasons, the section concerned will be called "drum".

The drum consists mainly of a central tubular element 1, to each end of which a flange 2 is fixed that is hexagon-shaped in the embodiment shown since a six-spindle lathe is supposed to be referred to. It goes without saying that the number of the sides of flange 2 will be the same as the number of the lathe spindles and, of course, as the number of the metal bar sliding guides.

Basically L-shaped metal sections 3 are fixed on central tubular element 1 in any known way, e.g. by welding, and the ends of these sections are in contact with the inner face of flanges 2 and they are made integral to the aforesaid faces, for instance by welding.

One side of sections 3 is positioned radially as against tubular element 1, while the second side is adjacent to one of the sides of flange 2 about half of its length. This side shall be a fixed supporting element for one of the two parts the sliding guides consist of. For this purpose, on the aforesaid side parallel to the corresponding side of flange 2, in the upper part there is fixed another metal section 4, which is L-shaped as well and is placed between the inner faces of flanges 2. A side of section 4 is fixed in any known way, e.g. by welding, to the corresponding side of section 3, while the other side is placed in a fundamentally radial direction towards the outside of the drum in a specular way as against the corresponding side of section 3.

The fixed halves of the sliding guides will be fixed to aforesaid sections 4 and those are shown only partially because they are of a known type, for instance those described in patent application No. 21041 A/79 filed in the previous name of the present applicant, F.lli Cucchi S.r.l., on Mar. 16, 1979.

The drum includes also other metal sections 5 which face sections 4 and are placed in a specular way as against them and which are meant to support the mobile parts of the sliding guides. Only in order to be clear the fixed parts of the sliding guides, or more exactly the part of them shown, are marked with 6, while what is shown of the mobile parts is marked with 7.

Also section 5 are fundamentally L-shaped and one of their sides is parallel to the corresponding side of section 4, while the other is basically radial as against the longitudinal axis of the drum.

Sections 5 are supported by the drum so that they can turn and for this purpose they are held through small brackets or blocks 8 placed longitudinally as against sections 5, two of these brackets or blocks for one of the aforesaid sections 5 being shown in FIG. 1.

Small brackets 8 can be better seen in FIGS. 3 to 6 and have an appendix 9 provided with a tranverse hole inside which a shaft 10 passes which, as shown better in FIGS. 1 and 2, is as long as the drum, its ends being inserted in holes 11 of flanges 2.

Small brackets 8 or, more precisely, their appendixes 9 are fixed on shaft 10, which is supported in such a way that it can turn by flanges 2, since their ends can turn inside holes 11 of the flanges themselves.

With reference to FIGS. 1 and 2 and to FIGS. 3, 4 and 9 as well as the connection between a fixed part 6 of a sliding guide and the corresponding mobile part 7 of the adjacent sliding guide will be described.

A plate 12 is fixed to section 5 supporting mobile part 7 of the guide and this plate is almost as high as the elements altogether part 7 of the sliding guide consists of. The end of plate 12 is fork-shaped and a connecting element 14 is pivoted to it thanks to a pivot 13, the connecting element consisting of a fundamentally parallelepipedon-shaped metal block.

The latter is pivoted at the other end, through a pivot 15, on the fork-shaped end of another connecting element 16, which is placed around a shaft 17 and fixed on it. Element 16 can be locked on shaft 17 in any known way, for example through screws, by welding or the like or any other means fit to make connecting element 16 integral with shaft 17 during revolutions.

Shaft 17 is supported in such a way that it can turn by backing plates 18, which have an upper sleeve-like part 18a in which shaft 17 turns and a lower substantially parallelepipedon-shaped part 18b which is fixed to section 4 supporting fixed part 6 of the metal bar sliding guide.

The connection just described and shown only once in FIGS. 1 and 2 is obviously scheduled also in other places along the length of the sliding guides and it has not been shown again in the aforesaid figures only in order to be clearer. It should be noticed that the number of connections as the described one depends on the length of the drum, which is necessary in order to get a uniform, precise opening and closing movement.

Now, with reference to FIGS. 1 and 2 but also to FIGS. 5 to 8 there will follow the description of the opening control contrivances scheduled for each of the guides, which are then connected to driving devices, described later on.

Figure 12:
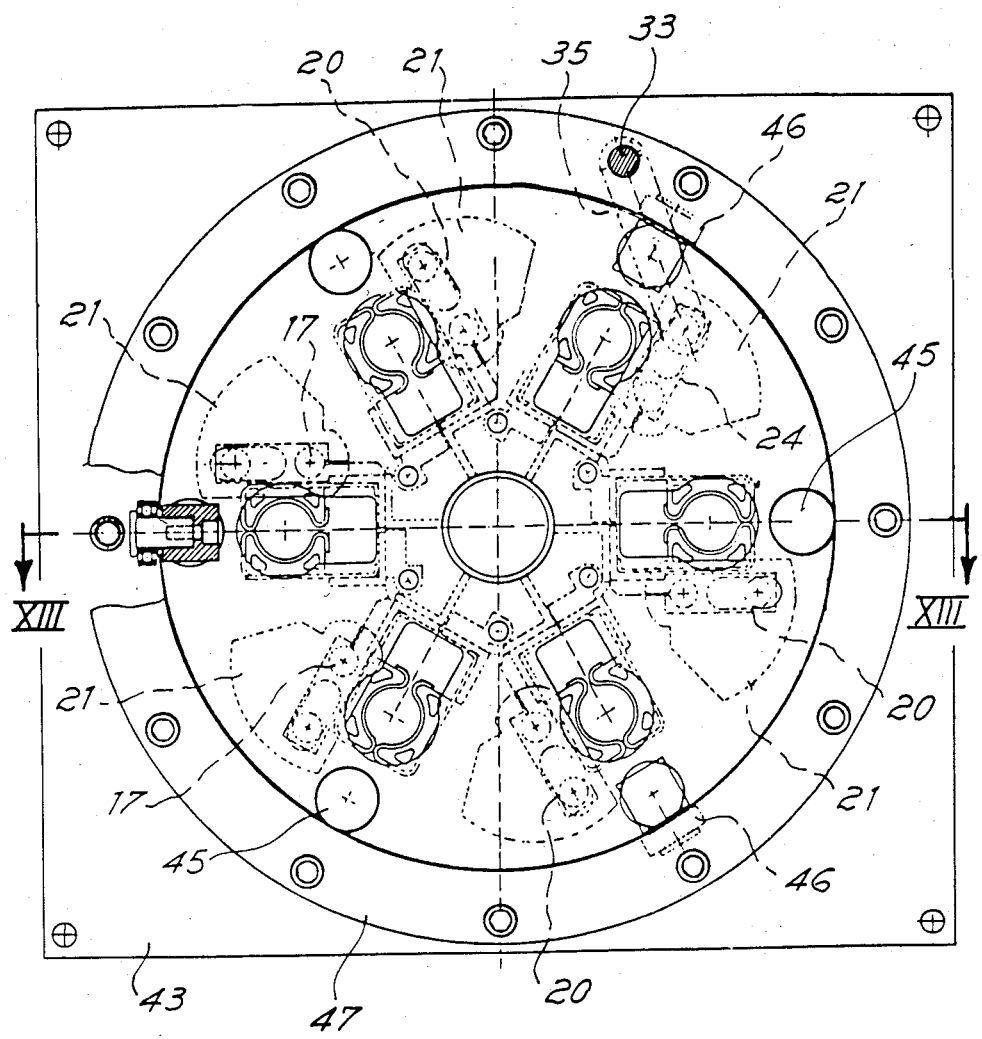
FIG. 12 is a front view and shows the support of the sliding guide drum.

These control contrivances are shown in details only in FIGS. 2, 5 and 6 for one sliding guide, since those for the other guides are the same, as can be seen in FIG. 12, where they are shown with a small dashes line in front view. They basically include a latch assembly marked with 19 and consisting of a fixed block 20 and a turning sector 21.

Stationary, parallelepipedon-shaped block 20 is fixed through its appendix 22 to the end of one of sections 4 and it is crossed by shaft 17, which can turn freely in the passage scheduled in block 20 just for this purpose.

Turning sector 21 faces and is almost in contact with one of the ends of block 20 and its bending radius is slightly bigger than the height of the latter.

Sector 21 is slined to shaft 17, for example through a key 23, as can be seen especially in FIGS. 5 and 6.

Corresponding to one of the straight sides of sector 21 there is a slot 24, the longitudinal axis of which passes through the centre of the cross-section of shaft 17.

With particular reference to FIGS. 7 and 8 it can be seen that inside block 20 a pin is scheduled to lock and release mobile part 7 of the sliding guide.

This pin, which is wholly marked with 25, has a smaller-diameter part 26 and a bigger-diameter part 27, which is substantially the same as the inner diameter of the passage in block 20.

Between the inner end of bigger-diameter part 27 and an inner projecting part 28 of the passage inside which pin 25 is placed there is scheduled a spring 29 meant to maintain pin 25 in the position shown in FIG. 7, in which its head 30 engages against projecting part 28. In this condition bigger-diameter part 27 of pin 25 partly projects from the passage in which the aforesaid pin is inserted and the projecting part is inserted into slot 24. Since the diameter of part 27 of pin 25 is substantially the same as the width of slot 24, in this way circular sector 21 is made integral with block 20 and, since sector 21 is integral with shaft 17, mobile part 7 of the sliding guide is kept in the close condition shown in FIG. 5.

To control the opening of the sliding guide i.e. a counterclockwise revolution of the same with reference to FIGS. 4 and 6 the driving contrivances hereinafter described with reference to FIGS. 3 to 11 are scheduled.

These contrivances (FIGS. 10 and 14) include a first driving piston 31 cylinder 32 of which is fixed to frame 43 of the machine at a height which slightly exceeds that at which latch 19 is placed. Stem 33 of piston 31 moves along an axis which is substantially parallel to the longitudinal axis of the sliding guides, passes through a flange 47 integral with frame 43 and can slide in guiding bushes 34 scheduled on crosspieces 34a held by brackets 34b fixed to frame 43 and acting also as stops for the movement forward and backward of stem 33. In fact, on a part limited by bushes 34 there is fixed the end of a driving pin 35 radially projecting as against stem 33 towards latch 19, in particular towards slot 24 of circular sector 21. The free end of pin 35 has a fundamentally cylindrical projecting part 36, the longitudinal axis of which is aligned with the longitudinal axis of pin 25, under the condition shown in FIG. 7, that is the sliding guides being locked in the close position. It is to be remarked also that cylindrical projecting part 36 of pin 35 is outside slot 24 to allow the sliding guide drum to turn. When piston 31 is brought into the condition shown in FIG. 8, projecting part 36 of pin 35 makes pin 35 go back, thus compressing spring 29. In this way circular sector 21 is disengaged from block 20, which can therefore turn keeping at the same time part 27 of pin 25 completely back in block 20.

Figure 11:
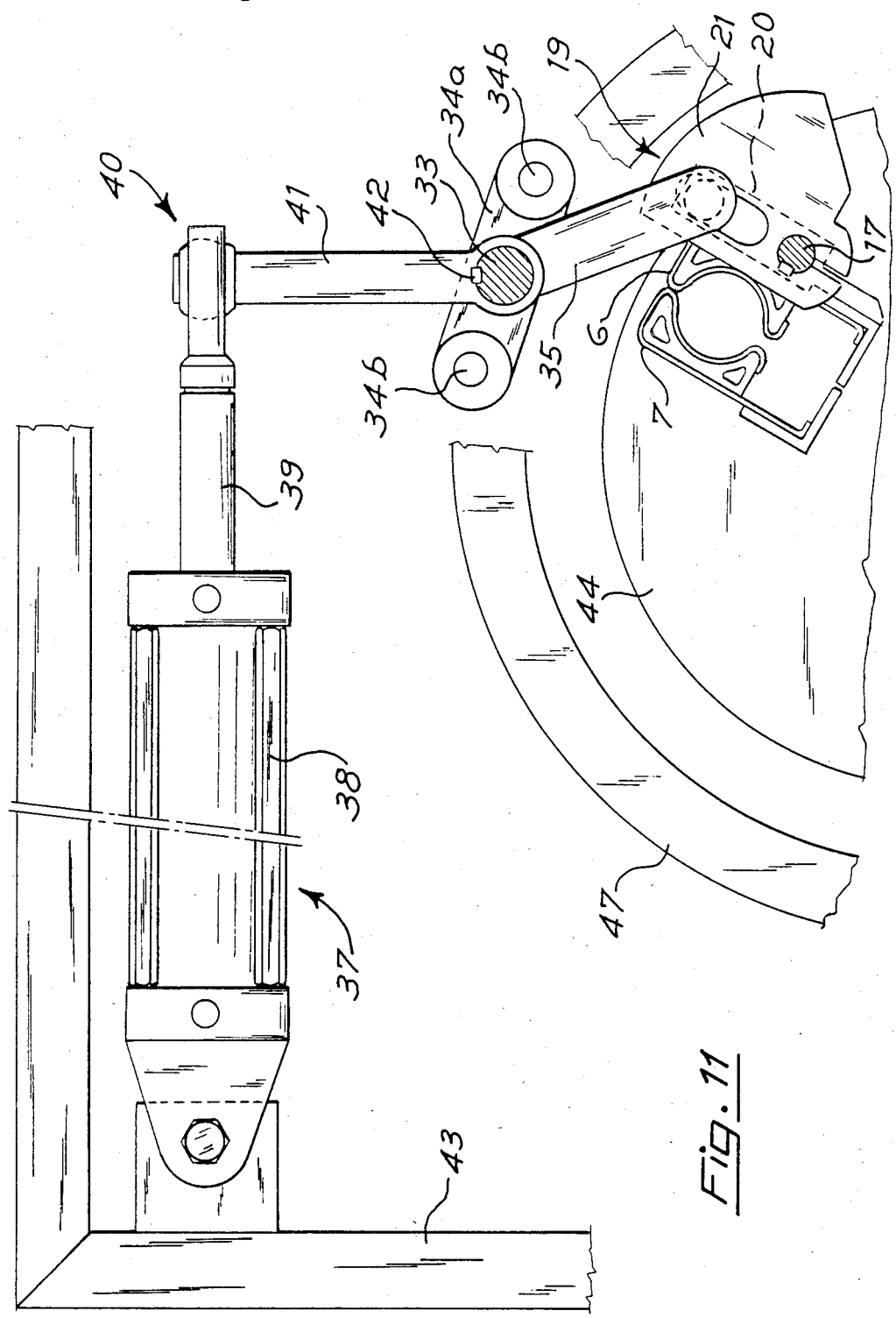
FIG. 11 is a view of the driving gadgets as per section XI—XI of FIG. 10.

Driving contrivances include also a second piston 37 (FIG. 11) cylinder 38 of which is fixed to frame 43 of the machine as well, while its stem 39 moves along an axis substantially perpendicular to the axis along which stem 33 of piston 31 moves. Stem 39 and stem 33 of pistons 37 and 31 are connected to each other through a known ball joint 40 and an arm 41 the end of which is connected to stem 33 as shown in FIG. 11 so as to allow stem 33 to slide inside the hole scheduled at the end of arm 41, but at the same time so as to prevent the reciprocal turning of stem 33 as against arm 41, which is possible thanks to a key 42 which will slide in an appropriate groove in stem 33.

With particular reference to FIGS. 12 to 14 schematically showing frame 43 of the equipment on its front side, i.e. on the left of the drum shown in FIGS. 1 and 2, it can be seen a basically circular plate 44 which can turn on frame 43 and supports the aforesaid drum.

According to this invention plate 44 is supported by frame 43 so as to keep the longitudinal axes of the sliding guides perfectly parallel to one another. These means include bearings 45 scheduled on plate 44 and co-operating with frame 43 radially and also bearings 46 co-operating with frame 43 and a counterplate 47 facing plate 44, the bearings acting as thrust bearings. Since counterplate 47 is integral with frame 43 of the machine by means of screws 48, plate 44 will be perfectly guided and maintained in position both longitudinally and transversally, thus preventing any misalignment concerning the longitudinal axes of the sliding guides.

This description highlights the advantages offered by the device that is the object of this invention and that turns out to be reliable as for the opening and closing of the metal bar sliding guides and fits to assure the correct insertion of the metal bars into the guides thanks to the drum supports. The supporting means described with reference to FIGS. 12 to 14 can be scheduled also at the other end of the drum.

As for the driving contrivances hereinabove described, i.e. driving pistons 31 and 37, they have been scheduled only once in relation to a pair of sliding guides, attaining one loading station. It is however possible to schedule others in angularly offset positions, thus creating several stations for the loading of metal bars, these stations being completely independent of one another.

What we claim is:

1. A control device for feeding metal bars to a multi-spindle lathe comprising:
   a frame;
   rotatable support means carried by said frame;
   a drum mounted on said support means for rotation about its longitudinal axis;
   bar guides fixedly secured to said drum for rotation therewith having a fixed half and a movable half, said movable half being pivotally mounted on said drum and adapted to be moved between opened and closed positions with respect to said fixed half;
   a first shaft having an axis parallel to said drum, said first shaft being rotatably mounted on said drum about said first shaft axis;
   a hinge transmission kinematic mechanism connecting said first shaft to said movable half and adapted to move said movable half between the opened and closed position;
   a latch mechanism connected to said first shaft, said latch mechanism including a fixed part secured on said drum and said first shaft being journaled therein, and a mobile part facing said fixed part and being secured on said first shaft for rotation therewith;
   a locking pin located within said fixed part and being parallel to said first shaft, said locking pin being positively locked within said mobile part when said movable half is closed;
   means operatively connected to said first shaft for disengaging said locking pin from said mobile part and for actuating the rotational movement of said first shaft whereby said movable half is opened.

2. The device according to claim 1 wherein said drum comprises:
   a central tubular element having flanges affixed thereto;
   a second shaft parallel to said central tubular element, said second shaft being journaled in said flanges and adapted to turn;
   a bracket being secured on said second shaft; and
   a section for holding said mobile half, said section being affixed to said bracket.

3. The device according to claim 1 wherein said fixed part is a block, said mobile part includes a slot, said locking pin being insertable within said slot thereby locking said guides closed.

4. The device according to claim 3 wherein said block has a height and said mobile part is a semi-circular sector, said sector having a radius greater than the height of said block, said sector being splined on said first shaft, said sector and said block being spaced apart.

5. The device according to claim 4 wherein said sector has a straight side and said slot is parallel to said straight side.

6. The device according to claim 3 wherein said block has a passage with a diameter therethrough, said passage being parallel to said first shaft, said locking pin being disposed within said passage, said locking pin having a smaller-diameter part and a larger-diameter part, said larger-diameter part having a diameter substantially equal to the diameter of said passage, further comprising:
   an inwardly projecting part located within said passage;
   elastic means for urging said larger-diameter part out of said passage, said elastic means being disposed between said larger-diameter part and said inwardly projecting part.

7. The device according to claim 6 wherein said slot has a width and said diameter of said larger-diameter part is substantially equal to the width of said slot.

8. The device according to claim 6 wherein said guides are opened when said larger-diameter part is urged out of said slot and maintained out of said slot by said sector.

9. The device according to claim 1 wherein said disengaging and actuating means comprises:
   a first piston secured on said machine frame, said first piston having a stem, said stem of said first piston being movable parallel to the axis of said first shaft;
   a radial pin secured on said stem perpendicular thereto;
   a projecting part affixed on said radial pin distally from and parallel to said stem of said first piston, said projecting part adapted to disengage said locking pin from said mobile part; and
   a second piston secured on said machine frame, said second piston having a stem, said stem of said second piston being movable perpendicular to said stem of said first piston, said second piston being adapted to actuate turning movement of said first shaft.

10. The device according to claim 9 further comprising:
    connecting means for joining said stem of said second piston to said stem of said first piston, said connecting means having a ball joint and an arm having a hole, said ball joint being located on a distal end of said stem of said second piston, said hole being located on said arm distally from said ball joint, said stem of said first piston being slidable in said hole, said arm translating movement of said stem of said second piston to angular movement of said stem of said first piston.

11. The device according to claim 9 wherein said guides are locked closed when said projecting part of said radial arm is disengaged from said mobile part.

* * * * *